United States Patent
Masuda et al.

[11] 3,712,402
[45] Jan. 23, 1973

[54] SUSPENSION SYSTEM FOR AN ENDLESS BELT TRACTION VEHICLE

[76] Inventors: Yasuo Masuda; Magohei Tsukamoto, both of 3500 Shinpara, Hamakita-shi, Japan

[22] Filed: Aug. 26, 1970

[21] Appl. No.: 67,034

[30] Foreign Application Priority Data

Sept. 1, 1969  Japan ................44/82451

[52] U.S. Cl. ...................180/5 R, 305/32
[51] Int. Cl. ....................B62d 55/30
[58] Field of Search.............180/5 R; 305/32

[56] References Cited

UNITED STATES PATENTS 3,613,811  10/1971  Brandli.........................305/24
3,439,763  4/1969   Pederson....................180/5 R X
3,494,438  2/1970   Rose..........................180/5 R
3,548,961  12/1970  Newman.......................180/5 R
3,474,751  10/1969  Hebert........................180/5 R X

*Primary Examiner*—Richard J. Johnson
*Attorney*—Flynn & Frishauf

[57] ABSTRACT

A suspension system for an endless belt traction vehicle and more particularly for a small size endless belt traction snow vehicle wherein the torsion spring fitted between the rear arms supporting the rear wheels about which there runs an endless track belt and the frame of the vehicle body has an easily adjustable spring force thereby freely to change the cushioning property and operating condition of the vehicle.

5 Claims, 3 Drawing Figures

SUSPENSION SYSTEM FOR AN ENDLESS BELT TRACTION VEHICLE

This invention relates to a suspension system for an endless belt traction vehicle and more particularly for a small size endless belt traction snow vehicle.

Some of the conventional small size snow vehicles can indeed so adjust the spring force of a suspension system as to provide the vehicle with a cushioning property which the driver desires to give him a driving comfort in accordance with the amount of load or the condition of the snow surface on which the vehicle travels and permit the loads distributed on the front skis and endless traction belt to be varied by raising or lowering its rear part in consideration of the travelling speed or the other operating condition of the snow vehicles. In such type of conventional vehicle, however, means for adjusting a spring force exerted on the suspension system is provided on the underside and in front of the rear sprocket wheels. Accordingly, said vehicle has the drawback that said means cannot be adjusted unless said vehicle is turned sideways.

The object of the present invention is, therefore, to provide an easily adjustable suspension system for an endless traction vehicle and more particularly for a small size endless belt traction snow vehicle.

SUMMARY OF THE INVENTION arms arms;

According to one aspect of the present invention there is provided a suspension system for an endless belt traction vehicle which comprises a pair of rear arms, one end of each of which supports the corresponding end of a shaft of the rear wheels fitted with the endless belt of a traction means and the other end of each of which is rotatably pivoted to the vehicle frame; spring means positioned between the rear arms and the vehicle frame which imparts an elastic resistance to the rotation of the rear arms with respect to the vehicle frame thereby elastically to support the rear part of the vehicle frame on the traction means through the rear arms; one end of said spring means being engaged with said rear arms and a spring adjusting means disposed between the other end of said spring means and the vehicle frame so as to vary the position of the spring means thereby to change said elastic resistance caused by said spring means.

Further concrete objects and advantages of the present invention will be more clearly understood from the following description taken with reference to the appended drawings, in which.

Figure 1:
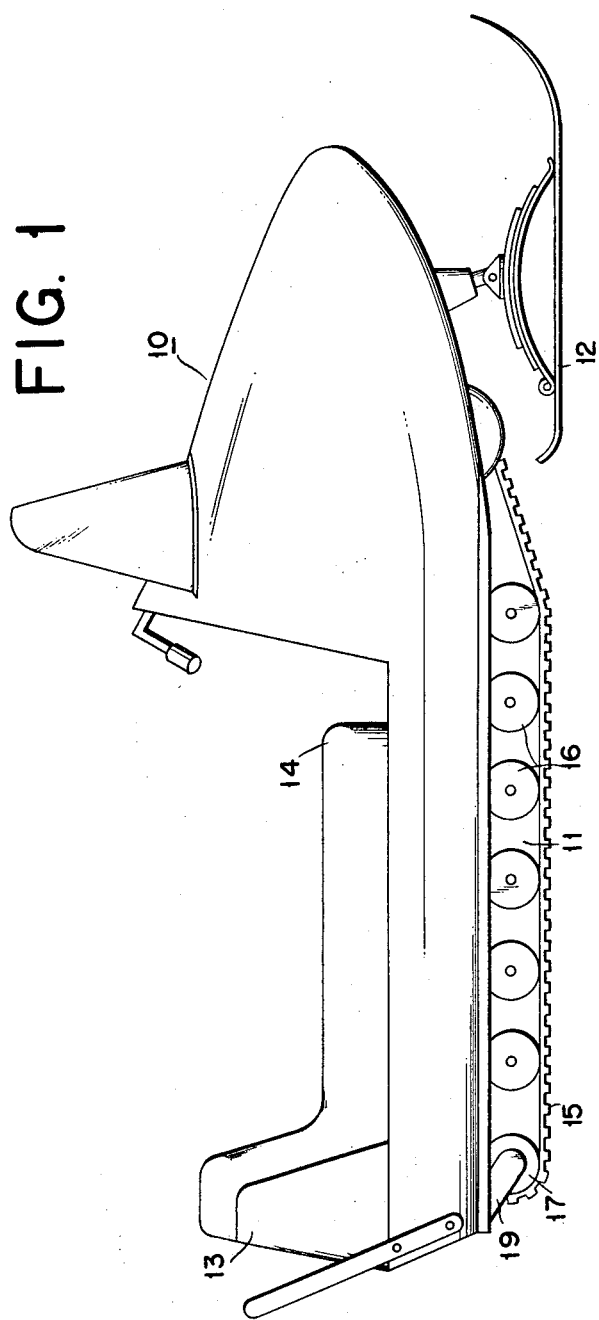
FIG. 1 is a side view of a snow vehicle embodying the present invention.
Figure 2:
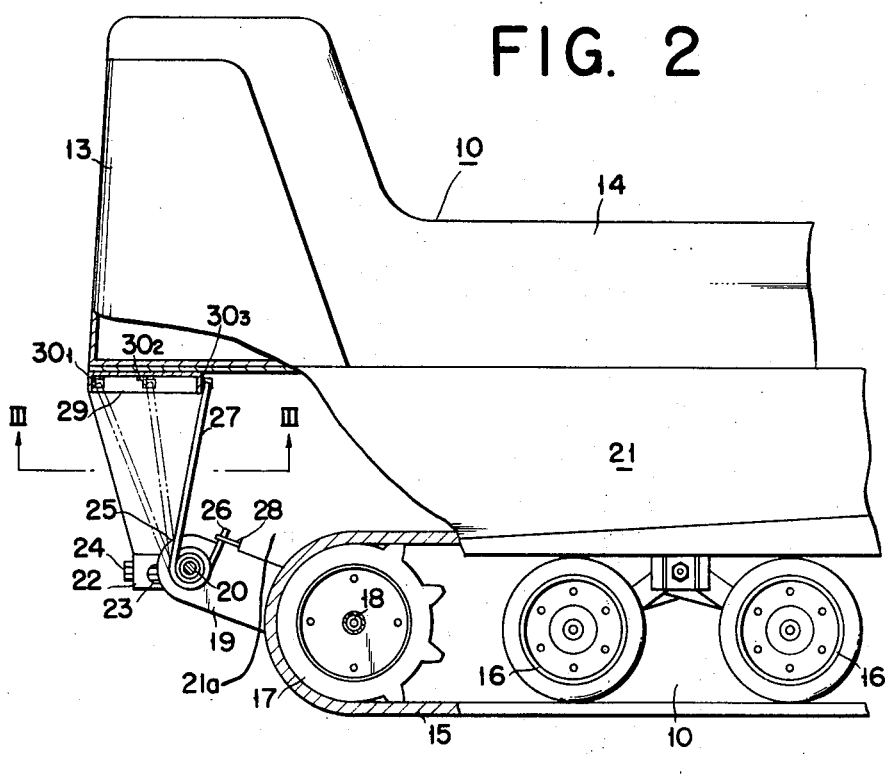
FIG. 2 is a fragmental enlarged side view, partly in section, of the rear part of the vehicle.
Figure 3:
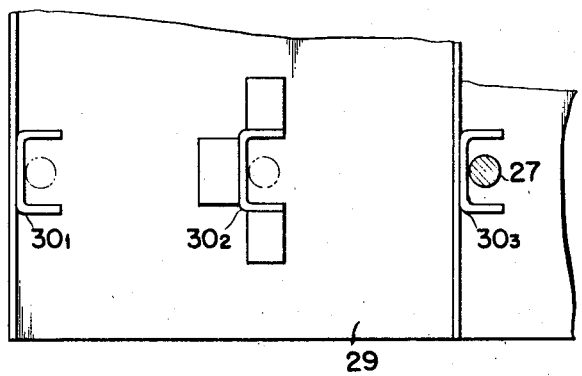
FIG. 3 is an enlarged view taken along the line III—III of FIG. 2.

Referring to FIG. 1, reference numeral 10 denotes the entire vehicle body, 11 an endless belt traction means and 12 a pair of front skis. The vehicle body 10 is provided at the front part with an engine (not shown) for driving the traction means 11 and at the rear part with a rumble 13 and a driver's seat 14. Referring to FIG. 2, the traction means 11 includes an endless track belt 15, several suspension wheels 16 and rear sprocket wheels 17. The shaft 18 of the rear sprocket wheels 17 is supported at each end by the front end of each of a pair of rear arms 19 extending rearward and upward therefrom and the rear end of each rear arm 19 is rotatably supported by a pair of pivot shafts 20. The pivot shaft 20 is located near the rear end of a vehicle frame 21 and slidably supported in an elongated hole 23 perforated in a bracket 22 fitted to the rear and lower part of both side plates 21a of the vehicle frame 21 in a manner to extend in the longitudinal direction of the vehicle body 10. The rear end of the vehicle frame 21 is open as shown in FIG. 2. Each pivot shaft is fitted at one end with an adjusting screw 24 whose controlled rotation permits the pivot shaft 20 to slide through the long hole 23 in the longitudinal direction of the vehicle body 10, thereby adjusting the tension of the endless track belt 15. Between the rear arms 19 and the vehicle frame 21 are disposed a pair of torsional coil springs 25 which elastically bias the rear wheels 17 against the ground and suspend the vehicle frame 21. Each torsional coil spring 25 is fitted around the pivot shaft 20 and provided at both ends with a short leg 26 and a vertical long leg 27 respectively. The short leg 26 is engaged with the rear arm 19 by a stopper 28, while the long leg 27 is so fitted as to have its position varied as described later with respect to the vehicle frame 21, thereby to adjust the elastic force of the torsional coil spring 25. The spring adjusting means comprises, as best seen in FIG. 3, a plurality of (three in this embodiment) channeled engagement members $30_1$, $30_2$ and $30_3$ welded, for example, in a straight line in the longitudinal direction of the vehicle body 10 to a reinforcement plate 29 attached to the rear inner or underside, and near the open rear end, of the vehicle frame 21. Each of the channeled engagement members constitutes a recess. A selected one of said recesses formed by said engagement members $30_1$, $30_2$ and $30_3$ is engaged with the upper end of the long leg 27 of the torsional coil spring 25.

If, in operation, the engaged position of the long leg 27 of the torsional coil spring 25 is changed from the engagement member $30_1$ to the other engagement members $30_2$ and $30_3$ in turn, then the cushioning property of the vehicle body will accordingly become more rigid (or stiff) with respect to the traction means 11 and at the same time the rear part of said body will be raised and in consequence the load distributed on the front skis will increase with the result that the operability of the snow vehicle is improved. When, therefore, the driver puts his hand in the open rear end of the frame 21 to grasp the long leg 27 of the torsional coil spring 25 near the upper end thereof for engagement of the upper end of the long leg 27 of the torsional coil spring 25 to be engaged with any desired one of the engagement members $30_1$, $30_2$ and $30_3$, he can quite easily select the cushioning property and operating condition of the snow vehicle which he prefers.

What we claim is:

1. In an endless belt traction vehicle including a vehicle frame having side plates and an open rear end, endless belt traction means, rear wheels engageable with said belt, a shaft for rotatably supporting said rear wheels, and a suspension system disposed between said traction means and said vehicle frame, the improvement wherein said suspension system comprises:

a pair of rear arms for supporting said shaft at the front ends of said rear arms;

a pair of pivot shafts supported by said side plates of said vehicle frame near the rear end thereof and rotatably coupling the rear ends of said rear arms with said vehicle frame;

a pair of torsional coil springs for imparting an elastic force through said rear wheels to the ground, each of said torsional springs comprising a short leg and a vertical long leg and being wound around each of said corresponding pivot shafts, said short leg of said torsional coil springs being engaged with the corresponding rear arm; and spring adjusting means disposed on the inner side of the vehicle frame near the open rear end thereof and engaging the upper ends of said long legs of said torsional coil springs for adjusting the position of said upper ends with respect to said vehicle frame so as to change said force of said torsional coil springs imparted to said rear arms substantially without varying the tension of said endless belt.

2. A vehicle as claimed in claim 1 wherein said spring adjusting means includes a plurality of recesses arranged lengthwise and disposed on the inner side of said vehicle frame near the open rear end thereof and selectively engaging the upper end of said long leg of each of said torsional coil springs to define the positions of said long legs with respect to said vehicle frame.

3. A vehicle as claimed in claim 1 wherein said spring adjusting means includes a plurality of channeled engagement members secured to the inner side of said vehicle frame near the open rear end thereof and arranged lengthwise of said vehicle frame for selectively receiving the upper ends of said long legs of said torsional coil springs, to thereby define the positions of said long legs with respect to said vehicle frame.

4. A vehicle as claimed in claim 1 wherein each of said pivot shafts is slidably engaged with the side plates of the vehicle frame near the open rear end thereof so as to slide lengthwise of said vehicle frame, the tension of said endless belt being controlled by selective sliding of said pivot shafts.

5. A vehicle as claimed in claim 4 including adjusting screw means coupled to said pivot shafts for adjusting the position of said pivot shafts relative to said vehicle frame to adjust said tension of said endless belt.

* * * * *

UNITED STATES PATENT OFFICE
CERTIFICATE OF CORRECTION

Patent No. 3,712,402   Dated January 23, 1973

Inventor(s) Yasuo MASUDA, et al

It is certified that error appears in the above-identified patent and that said Letters Patent are hereby corrected as shown below:

In the heading, add the following Assignment data:

--[73] Assignee:  Yamaha Hatsudoki Kabushiki Kaisha, Hamakita-shi, Shizuoka-ken, Japan Column 1, after "SUMMARY OF THE INVENTION" delete "arms arms;";

Column 1, line 41, after "arms" delete ";" insert --,--;

Column 1, line 42, after "arms" insert --;--.

Signed and sealed this 20th day of November 1973.

(SEAL)
Attest:

EDWARD M. FLETCHER, JR.
Attesting Officer

RENE D. TEGTMEYER
Acting Commissioner of Patents